(12) United States Patent
Roesgen

(10) Patent No.: US 6,493,508 B1
(45) Date of Patent: Dec. 10, 2002

(54) FUEL FILTER

(75) Inventor: Andre Roesgen, Remshalden (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 0 days.

(21) Appl. No.: 09/714,501

(22) Filed: Nov. 17, 2000

(30) Foreign Application Priority Data

Nov. 17, 1999 (DE) .......................................... 199 55 206

(51) Int. Cl.[7] ................................................ F24H 1/10
(52) U.S. Cl. ........................ 392/485; 392/502; 210/149
(58) Field of Search ................................. 392/491, 494, 392/502; 219/205–207, 544; 210/149, 184, 175

(56) References Cited

U.S. PATENT DOCUMENTS

| | | | | |
|---|---|---|---|---|
| 5,601,742 A | * | 2/1997 | Yamashita | 123/549 |
| 5,828,810 A | * | 10/1998 | Frank et al. | 219/544 |
| 5,904,844 A | * | 5/1999 | Stone | 210/232 |
| 6,147,335 A | * | 11/2000 | Von Arx et al. | 219/544 |

FOREIGN PATENT DOCUMENTS

DE  38 29 126  10/1989

* cited by examiner

Primary Examiner—Teresa Walberg
Assistant Examiner—Thor Campbell
(74) Attorney, Agent, or Firm—Crowell & Moring LLP

(57) ABSTRACT

A fuel filter 10 for filtering diesel fuel, in which a heater 14 is provided which at temperatures below 0° C. warms the diesel fuel in order to liquefy the diesel fuel so that a filter element 13 will not clog. The heater 14 includes a heat transfer body 29 onto which a supporting layer 35 is applied, which is thermally stable and electrically insulating. On this supporting layer 35 a heating element is provided which heats the thermal transfer body 29. A protective layer 37 is disposed over the heating element 34 in order to protect it.

11 Claims, 3 Drawing Sheets

FUEL FILTER

BACKGROUND OF THE INVENTION

The present invention relates to a fuel filter, especially a fuel filter for diesel engines.

Published German patent application no. DE 38 29 126 discloses a fuel filter which has a filter head with a fuel inlet and outlet, a filter cartridge and a fuel heater. The fuel heater serves to warm the fuel such as diesel fuel flowing through the filter. Diesel fuels contain components, such as paraffins, for example, which become viscous or solid at low temperatures below 0° C., so that the diesel fuel assumes a pulpy consistency. The result is that the fuel filter element, which is usually located in the fuel filter in the fuel line between the fuel tank and the motor, can become partially or completely clogged, so that the motor receives no more fuel and stalls.

So that diesel fuel will remain fluid and the fuel filter element will not clog, resistance heating is provided which is arranged in the filter head. This resistance heating is actuated through a semiconductor power switch and contains a heating element having a positive temperature coefficient (PTC element). The resistance of the PTC element increases abruptly when a temperature threshold is exceeded. To prevent the PTC element from overheating, a power switch is connected in series, which limits the maximum flow of the electric current.

To control the PTC element a regulating and supply circuit is necessary which includes a temperature-sensitive element. This temperature-sensitive element can be a bimetallic strip or a heat conductor. These components, however, require space for installation in the fuel filter, thereby increasing the space requirement for installation of the fuel filter.

As is generally known, diesel fuel must not be heated above 175° C., since at this point vapor bubbles begin to form which interfere with combustion.

PTC elements, however, can reach surface temperatures of 200° C., so that the diesel fuel that comes directly in contact with the PTC element may be heated above its critical point of 175° C. and vapor bubbles form. Furthermore, the performance of the PTC elements is dependent upon the volumetric flow and the temperature of the fuel.

SUMMARY OF THE INVENTION

It is therefore the object of the invention to provide a fuel filter with a heater, in which the heater occupies only a little amount of space.

It is also an object of the invention to provide a fuel filter which notwithstanding its space saving construction still provides for good transfer of heat to the fuel.

Yet another object of the invention is to provide a fuel filter which provides good heat transfer to the fuel while avoiding any excessive surface temperature.

These and other objects have been achieved in accordance with the present invention by providing a fuel filter comprising a filter head, a filter container sealingly joined to the filter head to form therewith a filter housing, a fuel inlet and a fuel outlet which communicate with the filter housing, a filter element disposed in the filter housing, the filter element sealingly separating an interior space of the filter housing into a raw side and a clean side, and a heater, wherein the heater comprises a heat transfer body having with at least one planar surface, a thermally stable supporting layer applied to the planar surface, a heating element applied to the supporting layer, a flange for mounting the heater in the fuel filter, and electrical contacts for a power supply.

The fuel filter according to the invention is advantageously suitable for heating fuel, especially diesel fuel and biodiesel (RME/PME), and thereby assures filtration of the fuel and the supply of fuel to the motor even at fuel temperatures of 5° C. or below, a heater being provided to warm the fuel, which requires little space for installation and produces surface temperatures not exceeding 120° C.

For this purpose the fuel filter has a filter head and a filter container which are sealingly joined together and together form a filter housing. The fuel filter furthermore has a fuel inlet, a fuel outlet, a filter medium and a heater. The filter head can be a cover serving no other purpose, or it can also serve for fastening the fuel filter to component parts on which the filter is to be mounted. Moreover, the fuel inlet and/or fuel outlet can be integrated into the filter head. The fuel inlet and fuel outlet communicate with a space formed by the filter container. The filter medium divides the housing space into a raw side, and a clean side sealingly separated therefrom. The fuel inlet communicates with the raw side and the fuel outlet with the clean side.

The heater is disposed on the raw side of the fuel filter so that the fuel is heated before it passes through the filter medium. For this purpose the heater can be arranged on the filter head or on the raw side of the filter container. It is also conceivable to integrate several heaters into the fuel filter. In this case a first heater can be provided on the bottom of the filter container and a second heater on the filter head. Also, several, e.g., three or four, heaters can be distributed on a wall of the filter container which may also have corners. In addition to heating the fuel, the heater can also be used to heat any separated water that collects in the bottom of the filter container.

The heater has at least one heat transfer body, a supporting layer, a heating element, a flange, and contacts for the power supply. The heat transfer body has at least one planar surface on which the supporting layer is applied. To prevent the supporting layer from being destroyed by the heat produced by the heating element, the supporting layer is formed of a thermally stable material, e.g., ceramic or metal. Moreover the supporting layer must cause no short circuit in the heating element, so the thermally stable material must additionally have electrical insulating properties, and the supporting layer must also have a good heat conducting property, since the heat produced by the heating element must be transferred through the supporting layer to the heat transfer body. For this purpose the supporting layer may be comprised, for example, of a ceramic layer (e.g. alumina), a plastic resin or an adhesive. The heating element can be a separate component which is attached to the supporting layer, or it can be applied onto the supporting layer, for example, by a screen printing method. The heating element can be applied in any configuration to the supporting layer, while striving to provide the greatest possible heating surface on the flat surface of the heat transfer body. The heating surface is influenced by the arrangement of the heating element. The heating element can be in laminar, spiral, circular or angular in form.

The flange serves to fasten and affix the heater to the fuel filter. If the heater is inserted into the filter housing from without, a gasket is to be provided between the portion which extends into the raw side and the portion which remains outside the fuel filter, so that no fuel can leak out of the fuel filter. If the heater is to be exclusively inside of the fuel filter, no gasket is needed. To fasten the heater to the filter housing, the flange may have, for example, a screw thread, mounting holes, a bayonet coupling or recesses for clamping hooks or clasps.

Furthermore, the heater has contacts for power supply. These contacts can be in the form of two cables which can be connected to a voltage source. Moreover, the contacts can be integrated in a plug which can be varied according to the customer's desire. The heating can be controlled through the contacts by an on-board computer, for example. The on-board computer can detect various data through sensors, such as engine data, outside temperature, and fuel temperature, and turn the heater on or off accordingly.

In one advantageous embodiment of the concept of the invention, the heater is arranged in the fuel inlet, since the fuel is warmed even before its first contact with the filter medium, and the narrowest cross section ahead of the filter medium is at this point, where the fuel can best be warmed.

A specific embodiment of the heating means comprises the use of a rod-like heat transfer body. In this embodiment the heat transfer body has a projection surface which has a narrower width in comparison to its length. In such an embodiment the heater can have a large planar surface and be integrated in a long, narrow passage.

Another embodiment of the invention provides the heat transfer body with a semicircular cross-sectional surface. This corresponds to a planar surface corresponding in its width to the diameter of the semicircular cross section, and a greater area is available along the arch of the cross section for heat transfer.

In accordance with another embodiment of the invention, at least one rib is provided which extends parallel to a longitudinal axis of the rod-like heat transfer body. Through the use of a rib the surface available for heat transfer is enlarged. If a plurality of ribs are used, the surface used for heat transfer is increased even more.

It is advantageous to affix an electronic device to the flat surface in order to control the heating. In this case the heating is independent of external controls or on-board computers. The electronic device can be soldered or adhesively bonded to the supporting layer, for example.

Another variant of the invention provides means for detecting the existing fuel temperature. This means can be a bimetal switch, for example, which turns the heater on and off.

One particular embodiment of the means for detecting fuel temperature comprises the use of a PTC element which turns the heat on or off depending on the fuel temperature and at the same time has very little structural volume or bulk. The electronic switch turns on or off in accordance with predetermined threshold values.

According to another embodiment of the invention, the heater contains two heat transfer bodies which are arranged with their flat surfaces against one another and have a common heating element. The first heat transfer body has the supporting layer and the heating element, and the second heat transfer body is applied either with a supporting layer or directly to the heating element without a supporting layer, and is attached to the first heat transfer body. Thus a single heating element heats two heat transfer bodies so that the heat produced is better transferred to the fuel.

It is advantageous to provide a protective coating to the planar surface with all of the elements provided thereon, such as the PTC element, electronic device, resistors and heating element, so that the fuel does not come in direct contact with these elements to destroy them. The protective coating may be comprised of a material which is not destroyed by the fuel and can also withstand the heat produced by the heating element. Also the material of the protective coating must not attack the mounted elements. Advantageously, the material also conducts the heat to the fuel. For example, a suitable protective coating can be formed of a two-component adhesive such as an epoxy resin or a glass/ceramic paste.

An example of a suitable device which may be adapted for use as a support/heating element composite in the present invention is a platinum resistance temperature sensor/heating element sold by the firm Heraeus of Kleinostheim, Germany under the trade name "Sensor-Nite".

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
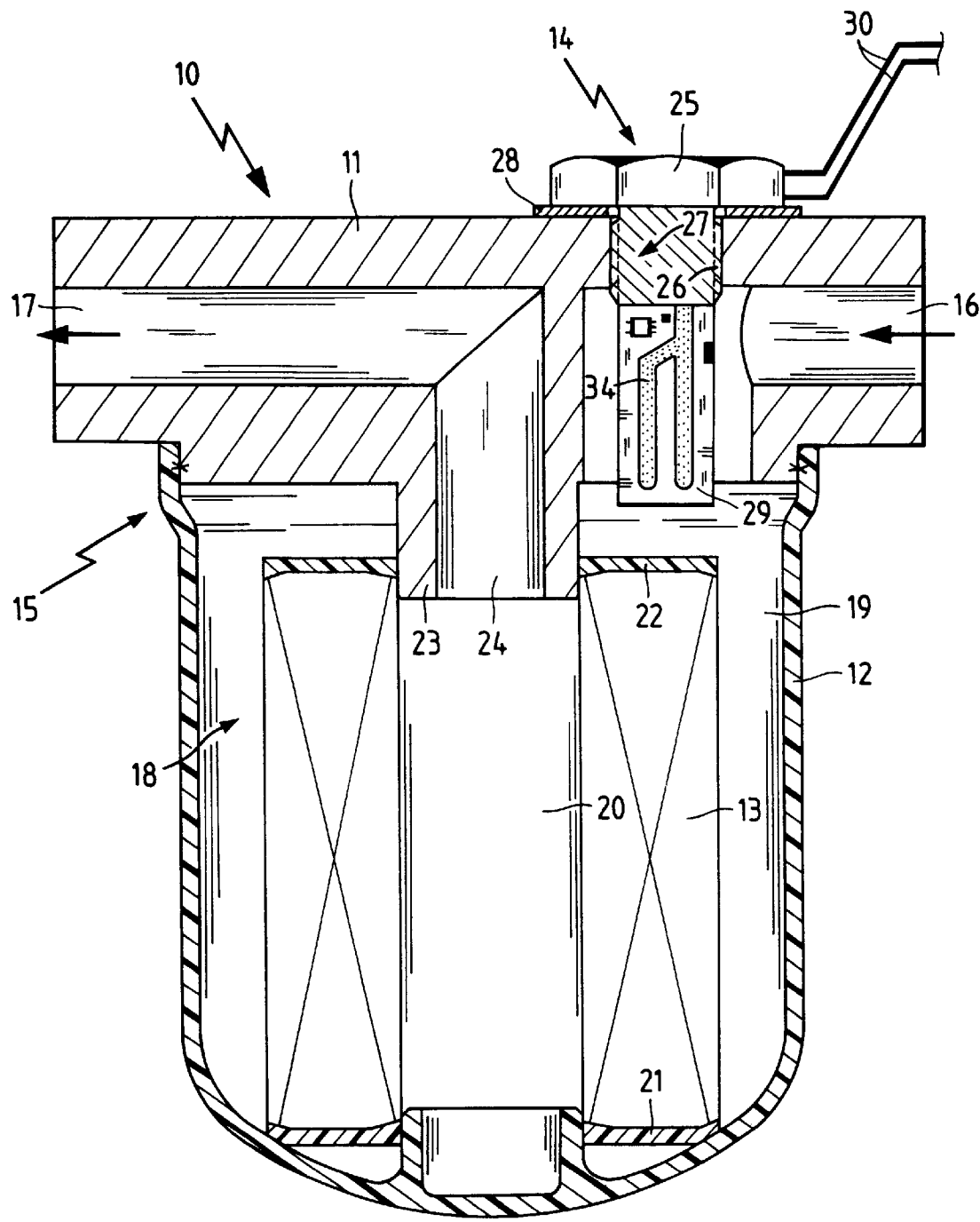
FIG. 1 shows a sectional view of a fuel filter according to the invention.

In FIG. 1 a fuel filter 10 is illustrated in a sectional view. The fuel filter 10 comprises a filter head 11, a filter container 12, a filter element 13 and a heater 14. The filter head 11 has a fuel inlet 16 and a fuel outlet 17 and is joined sealingly, for example by pressing, screwing or snapping, to the filter container 12, thereby forming a filter housing 15. The filter housing 15 surrounds a filter housing space 18. The filter element 13 is arranged in the filter housing space 18 and sealingly separates the space into a raw side 19 and a clean side 20 so that fuel can only pass from the raw side to the clean side through the filter element. The raw side 19 communicates with the fuel inlet 16 and the clean side 20 communicates with the fuel outlet 17. A base plate 21 of the filter element 13 is sealingly joined to the filter container 12, and an upper end plate 22 is sealingly joined to a nipple or spigot 23. The spigot 23 is formed on the filter head 11 and contains a connecting passage 24 which is connected to the fuel outlet 17.

A heater 14 is provided in the filter head 11. In this embodiment, the heater is sealingly screwed to the filter head 11. For this purpose the heater 14 has a hexagonal flange 25. This flange 25 is adjoined by a threaded portion 26 which is screwed into an internal thread 27 in the filter head 11. To seal the heater 14 a flat gasket 28 is inserted between the flange 25 and the filter head 11. The threaded portion 26 is adjoined by a heat transfer body 29. The latter is further explained with reference to FIGS. 2 and 3. Contact wires 30 are passed through the flange 25 and are connected to the electronic components of the heater 14. These contact wires 30 are connected to a plug, for example, or are directly attached to a voltage source, by soldering, for example.

As soon as the fuel flows into the fuel filter 10 through the fuel inlet 16, the fuel, at a fuel temperature under 5° C., for example, is heated by the heater 14. The warming of the fuel takes place as the fuel flows past the heater 14. Thus, the fuel is liquefied and does not clog the filter element, so that a motor connected to the fuel filer 10 is reliably supplied with fuel.

Figure 2:
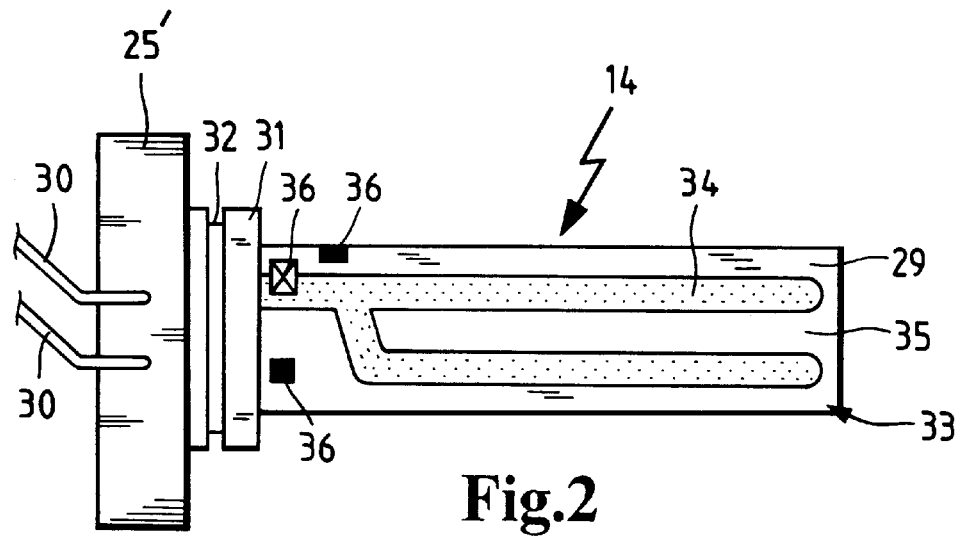
FIG. 2 shows a plan view of a heater.

FIG. 2 shows a front elevational view of the heater 14. In this embodiment, the flange 25' is a rectangular plate which has mounting holes (not shown). The flange is adjoined by a seal area 31. This seal area 31 has a groove 32 into which an annular gasket (not shown) can be inserted. This annular gasket forms a sealed joint with a bore (not shown) in the filter head 11 of FIG. 1.

The heat transfer body 29 has a flat surface 33 onto which a supporting layer 35 containing a heating element 34 is applied. Also, electronic components 36 are disposed on the supporting layer 35. The electronic components 36 may include, for example, an electronic circuit for evaluating a PTC element in order to detect the fuel temperature, or resistors or electronic chips.

Figure 3:
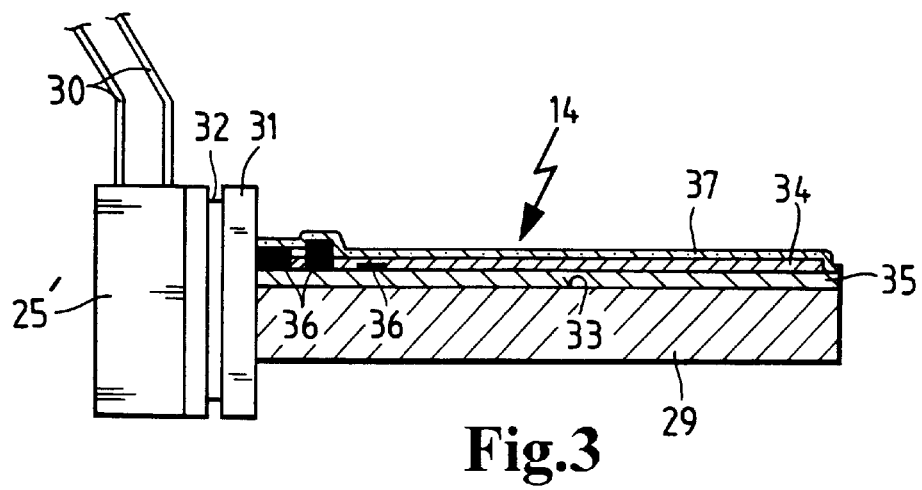
FIG. 3 is a side view of a heater.

In FIG. 3 a heater 14 is represented in a side elevation, The flange 25', as described in FIG. 2, is rectangular. The flange 25' is adjoined by the seal area 31 which is in turn adjoined by the heat transfer body 29, which may, for example, be made of aluminum. The supporting layer 35 is applied to the heat transfer body 29 and may be, for example, in the form of a ceramic-hybrid layer (e.g., an alumina ceramic with a vapor deposited film thereon). This supporting layer 35 bears the electronic components 36 and the heating element 34. A protective layer 37 is provided over these components 36, 34, and sealingly covers all components 34, 36, so that the fuel will not destroy these components 36, 34.

Figure 4:
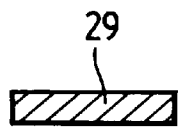
FIG. 4 is a cross-sectional view of a heat transfer body.

FIG. 4 shows a sectional view through a heat transfer body 29 with a rectangular cross-sectional surface.

Figure 5:
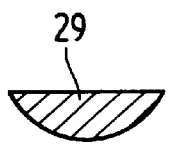
FIG. 5 is a cross sectional view of another heat transfer body.

FIG. 5 shows a sectional view through a heat transfer body 29 with a semicircular cross-sectional surface.

Figure 6:
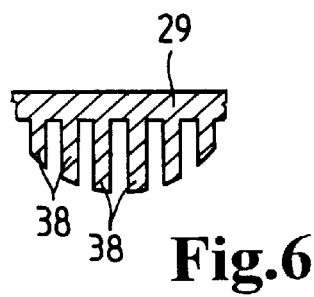
FIG. 6 is a cross sectional view of yet another heat transfer body.

FIG. 6 shows the cross-sectional surface of a heat transfer body 29 provided with a plurality of heat transfer ribs 38.

Figure 7:
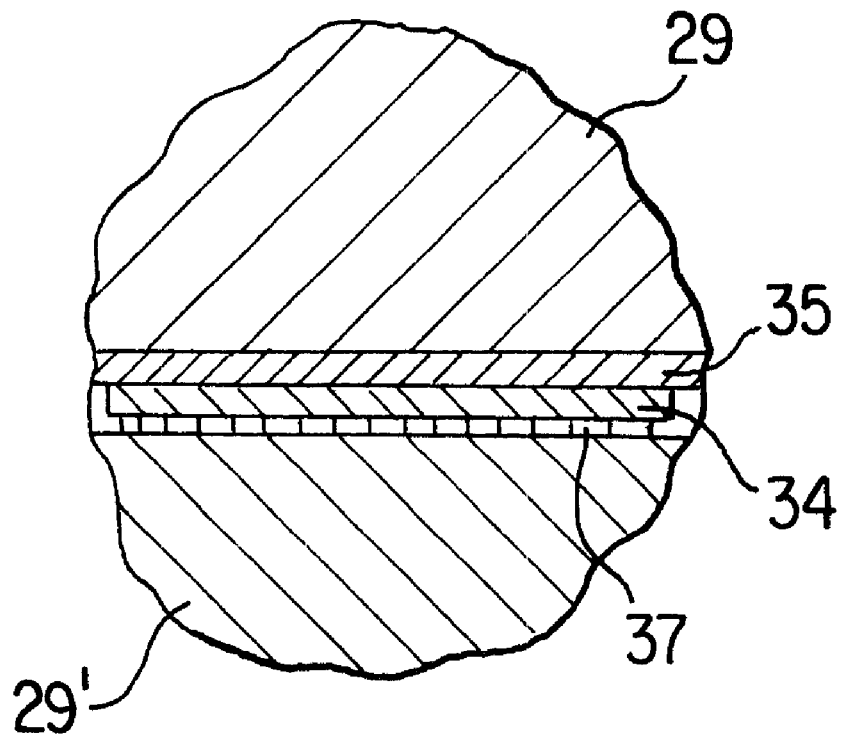
FIG. 7 shows a partial sectional view of a heater having two heat transfer bodies arranged with their flat surfaces against each other and with a common heating coil.

FIG. 7 shows a heater containing two heat transfer bodies 39, 39' which are arranged with their flat surfaces against one another and have a common heating coil 34. A supporting layer 35 and a protective layer 37 are disposed on the respective sides of the heating coil 34. Thus a single heating coil 34 heats two heat transfer bodies 39, 39' so that the heat produced is better transferred to the fuel.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A fuel filter comprising a filter head, a filter container sealingly joined to said filter head to form therewith a filter housing, a fuel inlet and a fuel outlet which communicate with the filter housing, a filter element disposed in the filter housing, said filter element sealingly separating an interior space of the filter housing into a raw side and a clean side, and a heater, wherein said heater is insertable from an exterior of the filter housing into the filter housing and comprises a heat transfer body having at least one planar surface, a thermally stable supporting layer applied to the planar surface, a heating coil applied to the supporting layer, a flange for mounting the heater in said fuel filter, and electrical contacts for a power supply.

2. A fuel filter according to claim 1, wherein said thermally stable supporting layer comprises a ceramic-hybrid layer.

3. A fuel filter according to claim 1, wherein the heater is disposed in the fuel inlet.

4. A fuel filter according to claim 1, wherein the heat transfer body is in the form of a rod.

5. A fuel filter according to claim 4, wherein the heat transfer body has a semicircular cross-section.

6. A fuel filter according to claim 1, wherein the heat transfer body comprises at least one heat transfer rib arranged parallel to the longitudinal axis of the heat transfer body.

7. A fuel filter according to claim 1, further comprising an electronic device arranged in the support layer mounted on the planar surface of the heat transfer body for controlling the heater.

8. A fuel filter according to claim 1, wherein the heater further comprises means for detecting the existing temperature of fuel introduced into the fuel filter.

9. A fuel filter according to claim 8, wherein the fuel temperature detecting means comprises a positive temperature coefficient element.

10. A fuel filter according to claim 1, wherein the heater comprises two heat transfer bodies with planar surfaces, said heat transfer bodies being arranged with their planar surfaces against one another, and said two heat transfer bodies both being heated by a single common heating element.

11. A fuel filter according to claim 1, further comprising a protective layer covering the planar surface and all elements applied thereto.

* * * * *